United States Patent
Wang et al.

(10) Patent No.: US 10,284,470 B2
(45) Date of Patent: May 7, 2019

(54) TECHNOLOGIES FOR NETWORK DEVICE FLOW LOOKUP MANAGEMENT

(71) Applicant: Intel Corporation, Santa Clara, CA (US)

(72) Inventors: Ren Wang, Portland, OR (US); Namakkal N. Venkatesan, Hillsboro, OR (US); Aamer Jaleel, Northborough, MA (US); Tsung-Yuan C. Tai, Portland, OR (US); Sameh Gobriel, Hillsboro, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 14/580,801

(22) Filed: Dec. 23, 2014

(65) Prior Publication Data
US 2016/0182373 A1    Jun. 23, 2016

(51) Int. Cl.
| H04L 12/743 | (2013.01) |
| H04L 29/06  | (2006.01) |
| H04L 12/747 | (2013.01) |

(52) U.S. Cl.
CPC ........ H04L 45/7453 (2013.01); H04L 45/742 (2013.01); H04L 69/22 (2013.01)

(58) Field of Classification Search
CPC ..................... H04L 29/08234; H04L 45/7453
See application file for complete search history.

(56) References Cited

U.S. PATENT DOCUMENTS

| 6,754,662 B1* | 6/2004 | Li .................... G06F 17/30949 |
| | | 707/693 |
| 2004/0172532 A1* | 9/2004 | Silverbrook ........... G06F 21/31 |
| | | 713/161 |
| 2008/0209069 A1* | 8/2008 | Aoki ...................... H04L 47/10 |
| | | 709/235 |

(Continued)

FOREIGN PATENT DOCUMENTS

| CN | 101305561 A | 11/2008 |
| CN | 101779434 A | 7/2010 |
| CN | 102769565 A | 11/2012 |

OTHER PUBLICATIONS

First Office Action for Chinese Patent Application No. 201510811033.9 dated May 16, 2018, 6 pages.

*Primary Examiner* — Andrew W Chriss
*Assistant Examiner* — Kenan Cehic
(74) *Attorney, Agent, or Firm* — Barnes & Thornburg LLP

(57) ABSTRACT

Technologies for managing network flow lookups of a network device include a network controller and a target device, each communicatively coupled to the network device. The network device includes a cache for a processor of the network device and a main memory. The network device additionally includes a multi-level hash table having a first-level hash table stored in the cache of the network device and a second-level hash table stored in the main memory of the network device. The network device is configured to determine whether to store a network flow hash corresponding to a network flow indicating the target device in the first-level or second-level hash table based on a priority of the network flow provided to the network device by the network controller.

21 Claims, 7 Drawing Sheets

(56) References Cited

U.S. PATENT DOCUMENTS

| | | | |
|---|---|---|---|
| 2011/0264923 A1* | 10/2011 | Kocher | G11B 20/00086 713/189 |
| 2014/0192813 A1 | 7/2014 | Hallivuori | |
| 2016/0124864 A1* | 5/2016 | Sun | G06F 12/1018 711/216 |
| 2016/0315834 A1* | 10/2016 | Thorup | H04L 43/04 |
| 2017/0111456 A1* | 4/2017 | Lim | H04L 67/141 |

* cited by examiner

TECHNOLOGIES FOR NETWORK DEVICE FLOW LOOKUP MANAGEMENT

BACKGROUND

Modern computing devices have become ubiquitous tools for personal, business, and social uses. As such, many modern computing devices are capable of connecting to various data networks, including the Internet and corporate intranets, to retrieve and transmit/receive data communications over such networks. To facilitate communications between computing devices, networks typically include one or more network devices (e.g., a network switch, a network router, etc.) to route communications from one computing device to another.

Software-defined networking (SDN) is one such networking architecture that may be used to facilitate communications (i.e., the flow of network packets) across the network. In a software-defined network, an externally located SDN controller is connected to network switching/routing devices to make the network traffic flow logic decisions for the network packets across the network, a task traditionally performed at the network device level. As such, network packet processing (e.g., network traffic flow logic) previously performed on dedicated network processors of the network devices may now be processed on general purpose processors, thereby reducing the complexity of the hardware components necessary for network devices deployed in a software-defined network and enabling deployment of new software-based features independently of hardware release cycle. Additionally, software-defined networks allow network infrastructures to become larger in scale than traditional networks, which may result in an increase of data relating to the network traffic flow logic that must be managed by each network device of the network. Network functions virtualization (NFV) is another network architecture concept for virtualizing network device functions using traditional server virtualization techniques (e.g., virtual machines, or VMs), thereby enabling the processing of network traffic on general purpose processors. When NFV and SDN infrastructures are combined, the network can be further increased in size, thereby further increasing the volume of network traffic flow logic that must be managed by each network device of the network.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
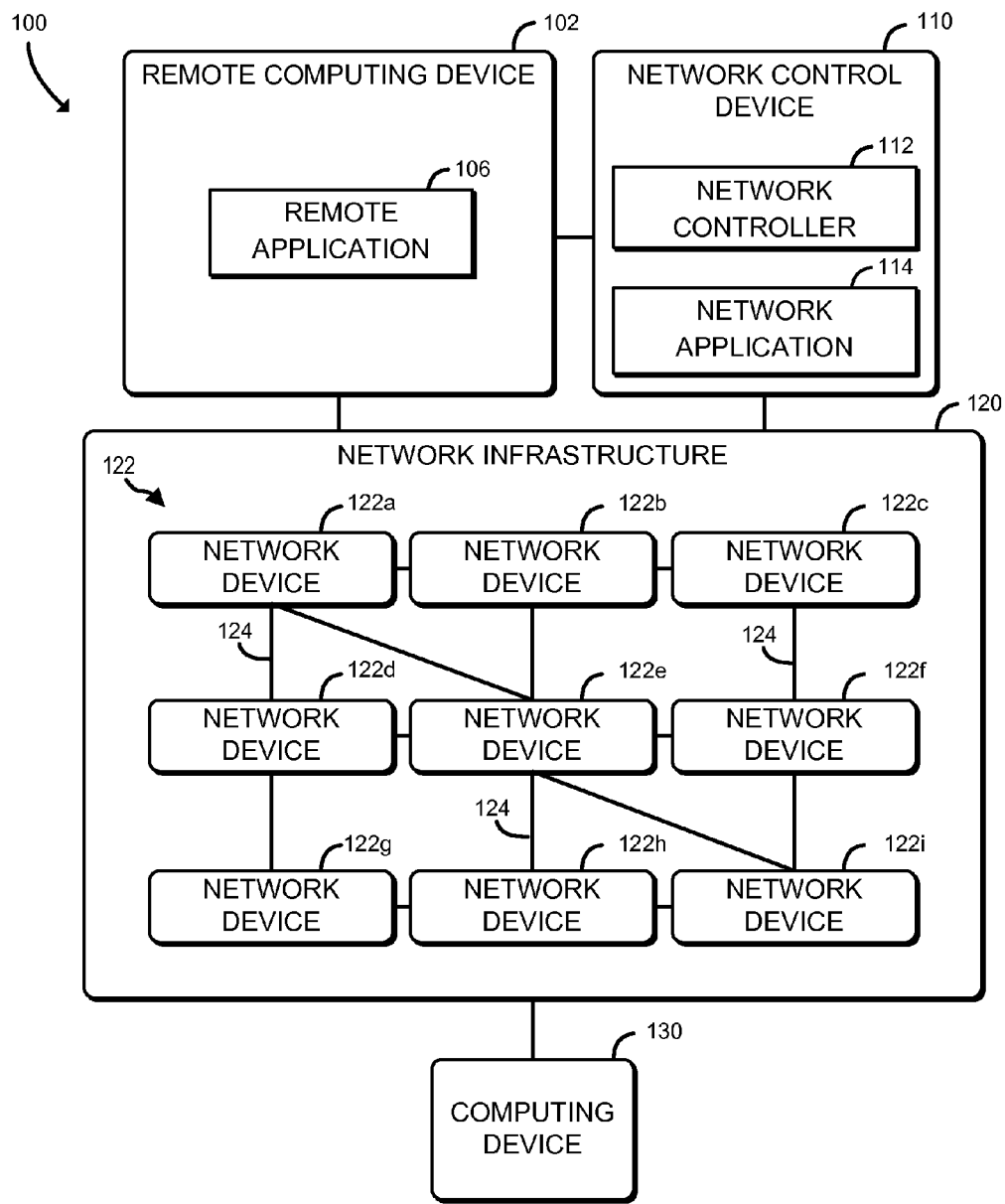
FIG. 1 is a simplified block diagram of at least one embodiment of a system for routing communications.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system or network 100 for network device flow lookup management includes a remote computing device 102 connected to a network control device 110 and a network infrastructure 120. Each of the network control device 110 and the network infrastructure 120 may be capable of operating in a software-defined networking (SDN) architecture and/or a network functions virtualization (NFV) architecture. The network infrastructure 120 includes at least one network device 122, illustratively represented as 122a-122h and collectively referred to herein as network devices 122, for facilitating the transmission of network packets between the remote computing device 102 and a computing device 130 via network communication paths 124.

In use, as described in further detail below, a network device 122 receives a network packet from the remote computing device 102, processes the network packet based on policies stored at the network device 122, and forwards the network packet to the next computing device (e.g., another network device 122, the computing device 130, the remote computing device 102, etc.) in the transmission path. To know which computing device is the next computing device in the transmission path, the network device 122 performs a lookup operation to determine a network flow. The lookup operation performs a hash on a portion of the network packet and uses the result to check against a flow lookup table (i.e., a hash table that maps to the network flow's next destination).

Typically, the flow lookup table is stored in an on-processor cache to reduce the latency of the lookup operation, while the network flows are stored in memory of the network device 122. However, flow lookup tables may become very large, outgrowing the space available in the on-processor cache. As such, portions of the flow lookup table (i.e., cache lines corresponding to network flow hash entries) are evicted to the memory of the network device 122, which introduces latency into the lookup operation. Additionally, which cache lines are evicted to memory is controlled by the network device based on whichever cache eviction algorithm is employed by the network device 122. However, in a multi-level flow hash table, certain levels of the multi-level flow hash table may be stored in the on-processor cache of the network device 122, while other levels of the multi-level flow hash table may be stored in the memory of the network device 122. For example, as will be described in further detail below, a multi-level flow hash table may include a first-level flow hash table to store higher priority level hashes stored in the on-processor cache, and a second-level flow hash table to store lower priority level hashes stored in the main memory. In such an embodiment, the overall latency attributable to the lookup operation may be reduced, in particular to those network flow hashes that have been identified to the network device 122 as having a high priority.

The network infrastructure 120 may be embodied as any type of wired or wireless communication networks, including cellular networks (e.g., Global System for Mobile Communications (GSM)), digital subscriber line (DSL) networks, cable networks, telephony networks, local or wide area networks, global networks (e.g., the Internet), or any combination thereof. Additionally, the network infrastructure 120 may include any number of additional devices as needed to facilitate communication between the respective devices.

In use, the network packets are transmitted between the remote computing device 102 and the computing device 130 along the network communication paths 124 interconnecting the network devices 122 based on a network flow, or packet flow. The network flow describes a set, or sequence, of packets from a source to a destination. Generally, the set of packets share common attributes. The network flow is used by each network device 122 to indicate where to send received network packets after processing (i.e., along which network communication paths 124). For instance, the network flow may include information such as, for example, a flow identifier and a flow tuple (e.g., a source IP address, a source port number, a destination IP address, a destination port number, and a protocol) corresponding to a particular network flow. It should be appreciated that the network flow information may include any other type or combination of information corresponding to a particular network flow.

The network communication paths 124 may be embodied as any type of wired or wireless signal paths capable of facilitating communication between the respective devices. For example, the network communication paths may be embodied as any number of wires, printed circuit board traces, via bus, point-to-point interconnects, intervening devices, and or the like. Any suitable communication protocol (e.g., TCP/IP) may be used to effect transmission of the network packets along the network communication paths 124, depending on, for example, the particular type or configuration of the remote computing device 102, the computing device 130, and the network devices 122. The network devices 122 may be embodied as any type of devices capable of facilitating communications between the remote computing device 102 and the computing device 130, such as routers, switches, and the like. In some embodiments, such as in NFV architecture, one or more of the network devices 122 may run one or more virtual machines (VMs) to implement the physical network functions of the network device 122 in software. In other words, some of the functions performed by the network devices 122 may be virtualized.

It should be appreciated that the illustrative arrangement of the network communication paths 124 is intended to indicate there are multiple options (i.e., routes) for a network packet to travel within the network infrastructure 120, and should not be interpreted as a limitation of the illustrative network infrastructure 120. For example, a network packet travelling from the network device 122a to the network device 122e may be assigned a network flow directly from the network device 122a to the network device 122e. In another example, under certain conditions, such as a poor quality of service (QoS) over the network communication path 124 between the network device 122a and the network device 122e, that same network packet may be assigned a network flow instructing the network device 122a to transmit the network packet to the network device 122b, which in turn may be assigned a network flow instructing the network device 122b to further transmit the network packet to the network device 122e.

Network packet management information (e.g., the network flow, policies corresponding to network packet types, etc.) is managed by a network application 114 and provided to a network controller 112 running on the network control device 110. In order for the network application 114 to effectively manage the network packet management information, the network controller 112 provides an abstraction of the network infrastructure 120 to the network applications 114. In some embodiments, the network controller 112 may update the network packet management information based on a QoS corresponding to a number of available network flows or a policy associated to a particular workload type of the network packet. For example, the computing device 130 may send a request to the remote computing device 102 requesting that the remote computing device 102 provide a video stream for playback on the computing device 130. The remote computing device 102, after receiving the request, then processes the request and provides a network packet including data (i.e., payload data, overhead data, etc.) corresponding to content of the requested video stream to one of the network devices 122. At the receiving network device 122, the received network packet is processed before updating a header of the processed network packet with identification information of a target device for transmitting the processed network packet to. The receiving network device 122 then transmits the processed network packet to the target device according to the network flow provided by the network controller 112. The target device may be another network device 122 or the computing device 130 that initiated the request, depending where the receiving network device 122 resides in the network infrastructure 120.

Certain network infrastructures 120 (i.e., data centers that include tens of thousands or more network devices 122) may contain a sufficiently large number of network devices 122 such that the number of network flows provided by the network controller 112 may be too vast in quantity to store in a priority level of storage of the network device 122. Additionally, even in smaller network infrastructures 120, each network device 122 may host a number of virtual machines (VMs), further increasing the amount of possible network flows for transferring network packets through the network infrastructure 120.

When a network packet is received at the network device 122, a lookup operation is performed by the network device 122 to determine a network flow corresponding to the received network packet. Users of the computing device(s) 130 expect near real-time responsiveness when interfacing with applications over the network infrastructure 120. For example, network latency (i.e., the amount of time for a network packet to get from one location to another) is readily discernible by the users in the form of wait time for a form to load, video to buffer, etc. As such, each network device 122 should process each network packet efficiently to eliminate, or reduce, latency attributable to the processing operation. For example, each incrementally lower level of possible storage in the network device 122 inherently suffers from increased latency as each level is accessed. If the network device 122 has to check multiple locations for a network flow associated with a particular network packet type (e.g., workload type, payload type, network protocol, etc.), such increased latency is introduced and response time is worsened. Therefore, keeping certain network flows readily accessible by the network device 122 in priority location(s) of the network device 122 reduces the possibility of introducing latency attributable to network flow accesses.

The remote computing device 102 may be embodied as any type of storage device capable of storing content and communicating with the network control device 110 and the network infrastructure 120. In some embodiments, the remote computing device 102 may be embodied as any type of computation or computer device capable of performing the functions described herein, including, without limitation, a computer, a multiprocessor system, a server, a computing server (e.g., database server, application server, web server, etc.), a rack-mounted server, a blade server, a laptop computer, a notebook computer, a network appliance, a web appliance, a distributed computing system, a processor-based system, and/or a network-attached storage (NAS) device. The remote computing device 102 may include any type of components typically found in such devices such as processor(s), memory, I/O subsystems, communication circuits, and/or peripheral devices. While the system 100 is illustratively shown having one remote computing device 102, it should be appreciated that networks including more than one remote computing device 102 are contemplated herein. In some embodiments, the remote computing device 102 may additionally include one or more databases (not shown) capable of storing data retrievable by a remote application 106.

The illustrative remote computing device 102 includes the remote application 106. The remote application 106 may be embodied as any type of application capable of transmitting and receiving data to the computing device 130 via the network devices 122 of the network infrastructure 120. In some embodiments, the remote application 106 may be embodied as a web application (i.e., a thin client), a cloud-based application (i.e., a thin application) of a private, public, or hybrid cloud. Additionally, in some embodiments, the network flow priority provided by the network controller 112 may be based on information received by the network controller 112 from the remote application 106. In other words, the remote application 106 may provide information to the network controller 112 of the network flow priority to be assigned to certain network packet types from the remote application 106. For example, a streaming network flow, or real-time network flow, transmitted to the network device 122 by the remote application 106 may instruct the network controller 112 to indicate to the network device 122 that the flow priority of the streaming network flow is to be a high priority network flow, as compared to other network flows.

While the illustrative system 100 includes a single remote application 106, it should be appreciated that more than one remote application 106 may be running, or available, on the remote computing device 102. It should be further appreciated that, in certain embodiments, more than one remote computing device 102 may have more than one instance of the remote application 106 of the same type running across one or more of the remote computing devices 102, such as in a distributed computing environment.

The network control device 110 may be embodied as any type of computing device capable of executing the network controller 112, facilitating communications between the remote computing device 102 and the network infrastructure 120, and performing the functions described herein. For example, the network control device 110 may be embodied as, or otherwise include, a server computer, a desktop computer, a laptop computing device, a consumer electronic device, a mobile computing device, a mobile phone, a smart phone, a tablet computing device, a personal digital assistant, a wearable computing device, a smart television, a smart appliance, and/or other type of computing or networking device. As such, the network control device 110 may include devices and structures commonly found in a network control device or similar computing devices such as processors, memory devices, communication circuitry, and data storages, which are not shown in FIG. 1 for clarity of the description.

The network controller 112 may be embodied as, or otherwise include, any type of hardware, software, and/or firmware capable of controlling the network flow of the network infrastructure 120. For example, in the illustrative embodiment, the network controller 112 is capable of operating in a software-defined networking (SDN) environment (i.e., an SDN controller) and/or a network functions virtualization (NFV) environment (i.e., an NFV manager and network orchestrator (MANO)). As such, the network controller 112 may send (e.g., transmit, etc.) network flow information to the network devices 122 capable of operating in an SDN environment and/or a NFV environment. In an SDN architecture, an SDN network controller serves as a centralized network management application that provides an abstracted control plane for managing configurations of the network devices 122 from a remote location.

In use, the network controller 112 is configured to provide certain policy information, such as flow-based policies and cache management policies, to the network devices 122 as discussed in further detail below. The policy information may be based on the type of network packet, such as, a network packet with a streaming workload. For example, the policy information may include a priority corresponding to network flow types to each of the network devices 122. As noted previously, the priority of the network flow may be based on the type of network packet (e.g., workload type, payload type, network protocol, etc.). The network flow priority, received by each of the network devices 122 from the network controller 112, includes instructions for the network devices 122 to use when determining where to store the network flow information (i.e., in the memory 208 or in the cache 204).

The network application 114, commonly referred to in SDN networks as a business application, may be embodied as any type of network application capable of dynamically controlling the process and flow of network packets through the network infrastructure 120. For example, the network application 114 may be embodied as a network virtualization application, a firewall monitoring application, a user identity management application, an access policy control application, and/or a combination thereof. The network application 114 is configured to interface with the network controller 112, receive packets forwarded to the network controller 112, and manage the network flows provided to the network devices 122.

In use, the network application 114 receives an abstract model of the topology of the network infrastructure 120 and adapts behavior of the network devices 122 of the network infrastructure 120. For example, the behavior adapted may be a change of the network flow. In some embodiments, changed network flow may be based on requirements of the remote application 106, commonly referred to as a reactive network flow. As will be described in further detail below, in some embodiments, the network application 114 may be an SDN application or other compute software or platform capable of operating on an abstraction of the system 100 via an application programming interface (API). In some embodiments, such as where the network application 114 is an SDN application, the network application 114 may provide network virtualization services, such as virtual firewalls, virtual application delivery controllers, and virtual load balancers.

The computing device 130 is configured to transmit and/or receive network packets to/from the remote application 106 via the network devices 122. The computing device 130 may be embodied as, or otherwise include, any type of computing device capable of performing the functions described herein including, but not limited to a desktop computer, a laptop computing device, a server computer, a consumer electronic device, a mobile computing device, a mobile phone, a smart phone, a tablet computing device, a personal digital assistant, a wearable computing device, a smart television, a smart appliance, and/or other type of computing device. As such, the computing device 130 may include devices and structures commonly found in computing devices such as processors, memory devices, communication circuitry, and data storages, which are not shown in FIG. 1 for clarity of the description.

Figure 2:
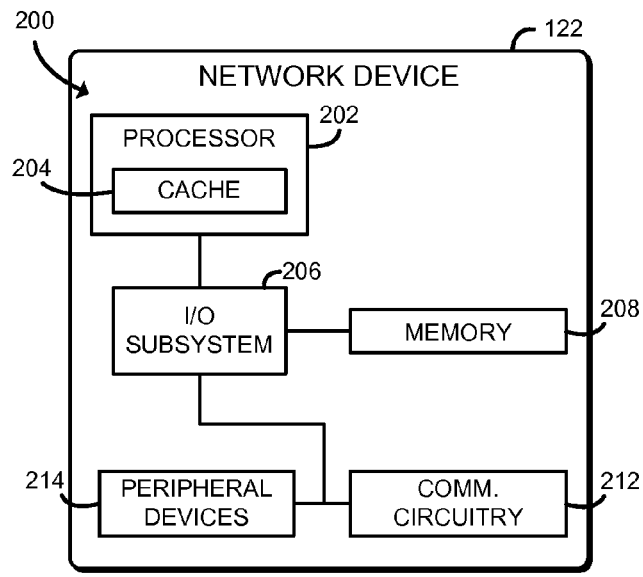
FIG. 2 is a simplified block diagram of at least one embodiment of a network device of FIG. 1 including a processor with on-die cache.

Referring now to FIG. 2, an illustrative network device 122 includes a processor 202 with an on-die cache 204, a main memory 208, and an input/output (I/O) subsystem 206, communication circuitry 212, and one or more peripheral devices 214. The network device 122 may be embodied as any type of computation or computer device capable of performing the functions described herein, including, without limitation, a general purpose computing device, a network appliance (e.g., physical or virtual), a web appliance, a router, a switch, a multiprocessor system, a server (e.g., stand-alone, rack-mounted, blade, etc.), a distributed computing system, a processor-based system, a desktop computer, a laptop computer, a notebook computer, a tablet computer, a smartphone, a mobile computing device, a wearable computing device, a consumer electronic device, or other computer device.

In use, as will be described in further detail below, when one of the network devices 122 receives the network flow information from the network controller 112, the network flow information is written to a network flow table, also commonly referred to as a routing table or a forwarding table. The network flow table is typically stored in the memory 208 (i.e., main memory) of the network device 122. Due to the latency associated with having to perform a lookup for the network flow information in the memory 208, the network flow information may be written to a hash table, or hash lookup table, typically stored in the cache 204 of the network device 122.

As will be described in further detail below, data may be stored in the on-die cache 204 or the memory 208. Data stored in the on-die cache 204 can be accessed at least an order of magnitude faster than data fetched from the memory 208. In other words, keeping certain data in the on-die cache 204 allows that data to be accessed faster than if that data resided in the memory 208. However, on-die cache 204 space is limited, so the network device 122 generally relies on a cache replacement algorithm, also commonly referred to as a replacement policy or cache algorithm, to determine which data to store in the on-die cache 204 and which data to evict to the memory 208. Each entry of the hash table is stored in a cache line of the on-die cache 204. Typically, cache replacement algorithms rely on hardware of the network device 122 (e.g., the processor 202) to determine which cache lines to evict. For example, a least recently used (LRU) cache replacement algorithm evicts the least recently used cache line first, regardless of the importance of the data stored in the cache line. Such cache replacement algorithms using hardware predictions to determine which cache line to evict are error prone and even small errors can result in coherency violations and cache pollution, which can increase latency. In some embodiments, the on-die cache 204 of the processor 202 may have a multi-level architecture. In such embodiments, data in the on-die cache 204 typically gets evicted from the lowest level of the on-die cache 204 to the highest level of the on-die cache 204, commonly referred to as last-level cache (LLC). When data is evicted from the highest level of the on-die cache 204 (i.e., the LLC), the data is generally written to the memory 208.

The processor 202 may be embodied as any type of processor capable of performing the functions described herein. For example, the processor 202 may be embodied as a single or multi-core processor(s), digital signal processor, microcontroller, or other processor or processing/controlling circuit. The memory 208 may be embodied as any type of volatile or non-volatile memory or data storage capable of performing the functions described herein. In operation, the memory 208 may store various data and software used during operation of the network device 122. The memory 208 is communicatively coupled to the processor 202 via the I/O subsystem 206, which may be embodied as circuitry and/or components to facilitate input/output operations with the processor 202, the memory 208, and other components of the network device 122. The I/O subsystem 206 is configured to facilitate the transfer of data to the on-die cache 204 and the memory 208. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 208, and other components of the network device 122, on a single integrated circuit chip.

The communication circuitry 212 may be embodied as any communication circuit, device, or collection thereof, capable of enabling communications between the remote computing device 102, the network control device 110 and other network devices 122 over a network. The communication circuitry 212 may be configured to use any one or more communication technologies (e.g., wireless or wired communications) and associated protocols (e.g., Ethernet, Bluetooth®, Wi-Fi®, WiMAX, etc.) to effectuate such communication. In some embodiments, the communication circuitry 212 includes cellular communication circuitry and/or other long-ranged wireless communication circuitry. The one or more peripheral devices 214 may include any type of peripheral device commonly found in a computing device, and particularly a network device, such as a hardware keyboard, input/output devices, peripheral communication devices, and/or the like, for example. It is contemplated herein that the peripheral devices 214 may additionally or alternatively include one or more ports for connecting external peripheral devices to the network device 122, such as USB, for example.

Figure 3:
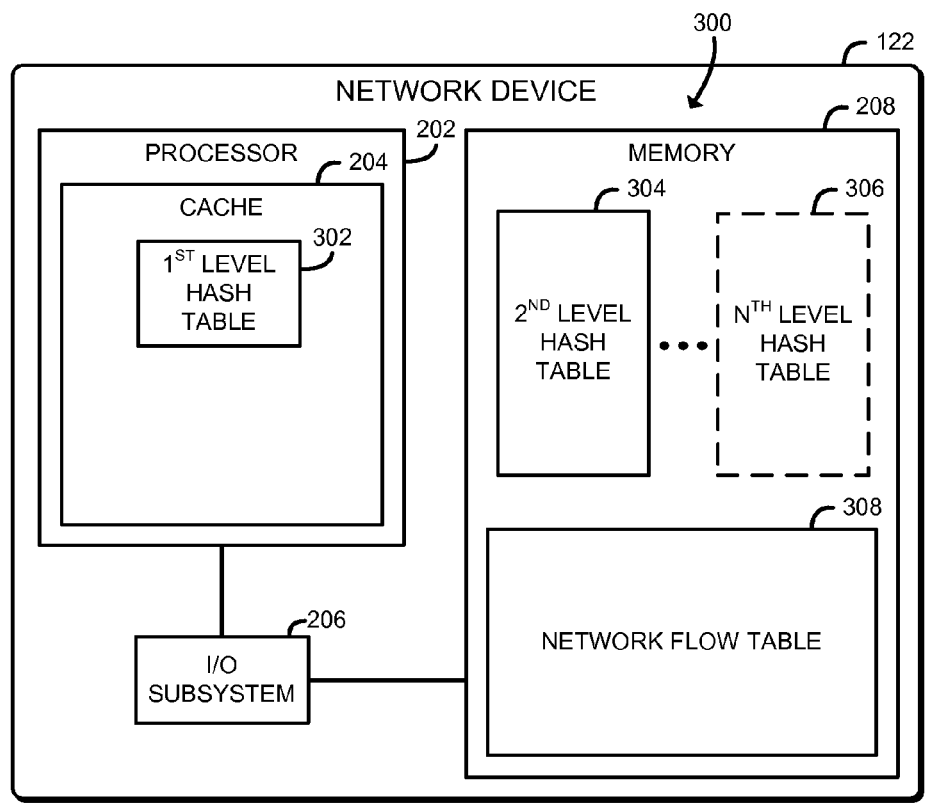
FIG. 3 is a simplified block diagram of at least one embodiment of a multi-level hash table configuration of the network device of FIG. 2.

Referring now to FIG. 3, an illustrative embodiment of an arrangement 300 of the network device 122 including a multi-level hash table is shown. Emerging technologies allow data centers and carrier networks to continually increase in size and capacity, creating ever bigger network infrastructures and introducing more network flow options as a result. Additionally, the emergence of virtual machines (VMs) has further increased the number of network flows available in the network infrastructure 120. In some embodiments, the present single level hash tables may become so large that the entirety of the hash table cannot fit into the on-die cache 204 of the network device 122. The illustrative multi-level hash table includes a first-level hash table 302 and a second-level hash table 304. In some embodiments, the multi-level hash table further includes an "Nth" level hash table 306, where "N" is a positive integer and designates one or more additional levels of hash tables beyond the second-level hash table 304. The illustrative first-level hash table 302 resides in the on-die cache 204 of the processor 202, while the illustrative second-level hash table 304 and the "Nth" level hash table 306 reside in the memory 208. Each of the first-level hash table 302 and the second-level hash table 304 through the "Nth" level hash table 306 include hash entries mapped to network flows stored in the memory 208 based on a priority of the network flows and/or an access frequency of the network flows. Additionally, as will be described in further detail below, as the priority of the network flows change and/or the access frequency of the network flows changes over time, the I/O subsystem 206 may move certain hash entries between the on-die cache 204 and the memory 208.

The hash entries of the first-level hash table 302 may be locked into the on-die cache 204 based on the priority of the network flow provided to the network device 122 from the network controller 112. For example, a network flow for a real-time network packet may be given a higher priority than a network packet that is not expected to be processed in real-time. In another example, a network flow that is going to be accessed more frequently than another network flow may be given a higher priority. Additionally or alternatively, the hash entries of the first-level hash table 302 may be locked into the on-die cache 204 based on the frequency which the hash entries are accessed. For example, the network controller 112 may inform the network device 122 that certain priorities are superseded by hash entries that are accessed more than a predetermined number of times (i.e., an access frequency threshold). In some embodiments, an access counter may be stored corresponding to each hash entry to track the access frequency. An access counter corresponding to an accessed hash entry may be incremented each time the hash entry was accessed. In some embodiments, the access counter may additionally include a timestamp indicating the last time the access counter was incremented. In some embodiments, the network controller 112 may additionally inform the network device 122 to reset access counter that have not been accessed for a predetermined period of time, to avoid the access frequency from becoming stale and resulting in cache pollution.

The first-level hash table 302, residing on the on-die cache 204 of limited, generally smaller size, is typically smaller than the other levels of hash tables. In use, as will be described in further detail below, when a network packet is received by the network device 122, a portion of the header is decoded to extract key fields. A hash function is then performed on the key fields extracted, and a lookup is performed on the first-level hash table 302 in the on-die cache 204. A "hit" occurs if the lookup is successful (i.e., the lookup found the hash in the first-level hash table 302 of the on-die cache 204), and the data associated with the flow stored in the network flow table 308 is typically updated. A "miss" occurs if the lookup is unsuccessful (i.e., the lookup did not find the hash in the first-level hash table 302 of the on-die cache 204). A "hit" is faster (i.e., fewer computation cycles) than a "miss," due to the network device 122 having to perform a lookup at each remaining level until a "hit" occurs.

Figure 4:
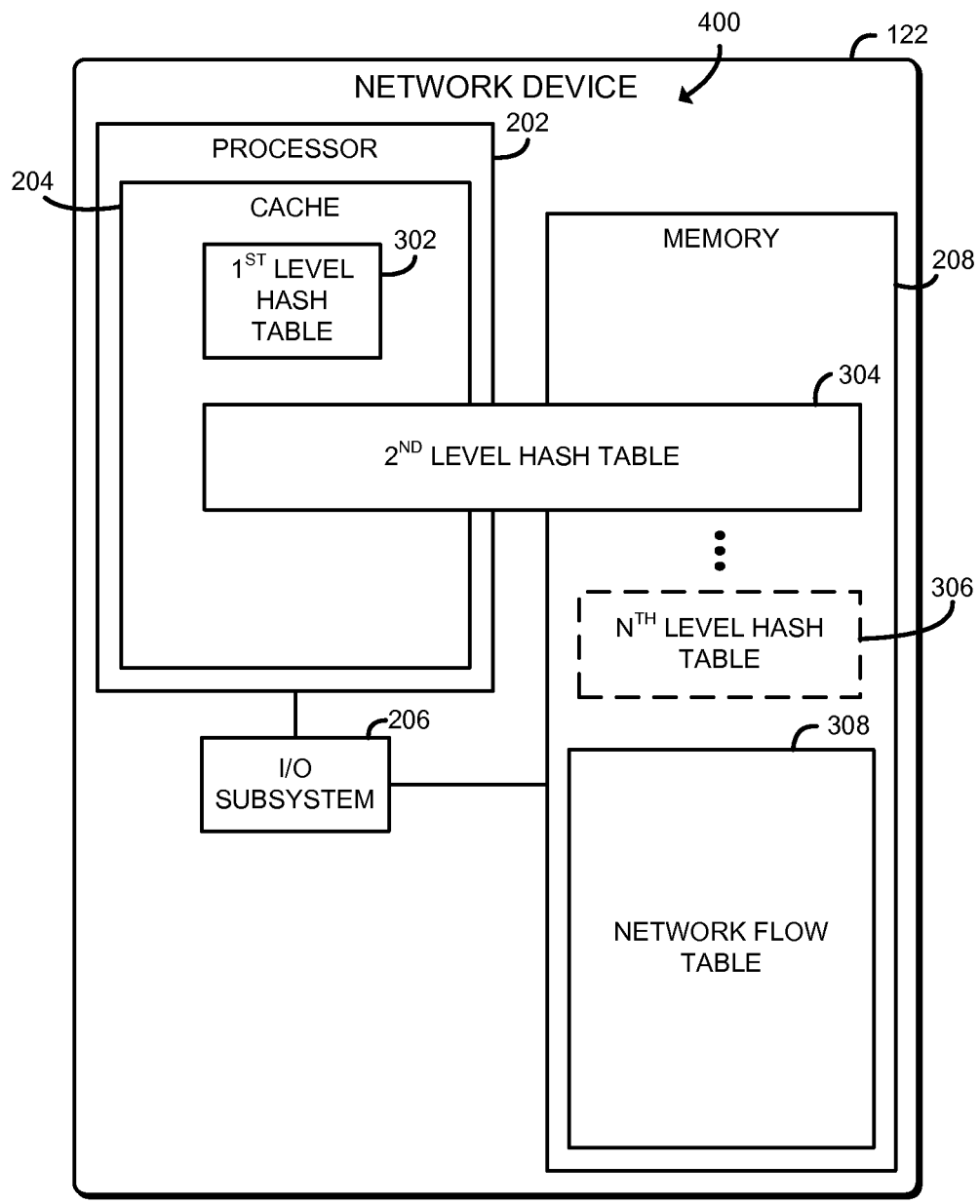
FIG. 4 is a simplified block diagram of another embodiment of a multi-level hash table configuration of the network device of FIG. 2.

In the illustrative arrangement 300, the second-level hash table 304 resides completely in the memory 208, and, as such, a lookup operation in the memory 208 may result in at least an order of magnitude longer I/O latency than if the lookup had found the hash in the first-level hash table 302 of the on-die cache 204. It should be appreciated that, in some embodiments, other arrangements are contemplated herein. For example, FIG. 4 shows an illustrative embodiment of an arrangement 400 of the network device 122 including a multi-level hash table where at least a portion of the second-level hash table 304 resides in the on-die cache 204 of the processor 202. In some embodiments, certain flow priorities may additionally include information regarding the exclusivity of the levels of the multi-level hash table. For example, the network controller 112 may provide information to instruct the network device 122 to only include hash entries corresponding to high priority flows to the first-level hash table 302, and not to the second-level hash table 304. In another example, the network controller 112 may provide information to instruct the network device 122 to only include hash entries corresponding to high priority flows in the first-level hash table 302 and to only include frequently accessed hash entries in the portion of the second-level hash table 304 that resides in the on-die cache 204. In still another example, the network controller 112 may provide information to instruct the network device 122 to include hash entries corresponding to high priority flows and frequently accessed hash entries in the first-level hash table 302 and the second-level hash table 304.

Referring again to FIG. 3, the illustrative arrangement 300 includes a network flow table 308. As noted previously, the network flow information typically includes a flow identifier and a flow tuple, which are written to the network flow table 308. The network flow table may additionally or alternatively include any other type or combination of information corresponding to a particular network flow. The network flow table 308 is typically stored in the memory 208 (i.e., main memory) of the network device 122. It should be appreciated that, in some embodiments, the first-level hash table 302 may be larger in size than the portion of the second-level hash table 304, while in other embodiments the portion of the second-level hash table 304 may be larger in size than the first-level hash table 302.

Figure 5:
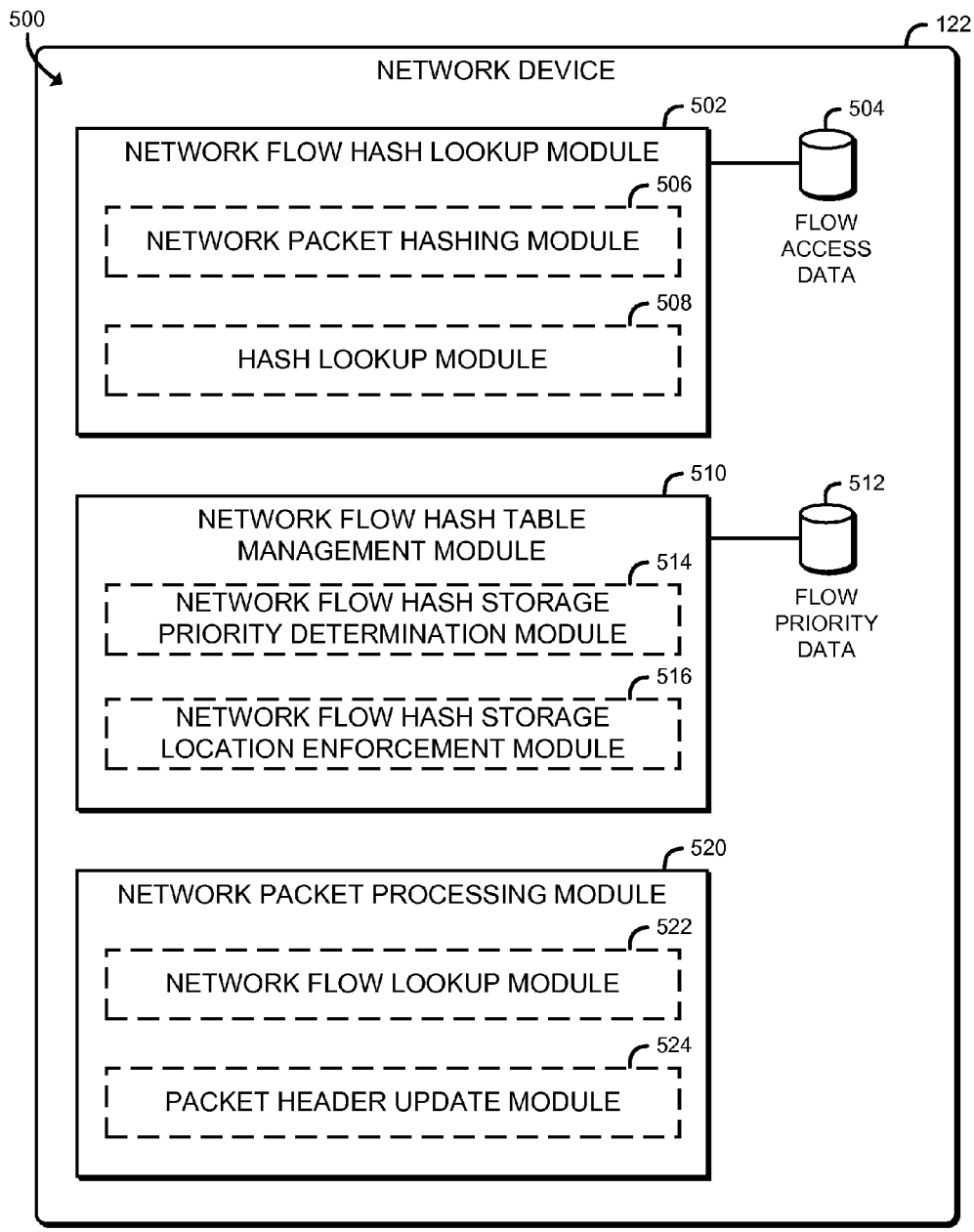
FIG. 5 is a simplified block diagram of at least one embodiment of an environment of the network device of FIG. 2.

Referring now to FIG. 5, in use, each of the network devices 122 establishes an environment 500 during operation. The illustrative environment 500 includes a network flow hash lookup module 502, a network flow hash table management module 510, and a network packet processing module 520. The network flow hash lookup module 502 includes flow access data 504 that may include data representative of access counts corresponding to hash entries in the hash table. For example, each time a hash is accessed in a hash table, regardless of the level, a counter corresponding to the counter may be incremented to provide a historical reference to the frequency of access by the network device 122 for that hash. In some embodiments, additional information, such as a time of access and/or a last "hit" hash table level, may be included in the flow access data. The network flow hash table management module 510 includes flow priority data 512 received from the network controller 112. The flow priority data 512 includes policies (i.e., instructions) to indicate to the network flow hash table management module 510 which network flow hash entries to place in which level of the multi-level hash table. In some embodiments, the flow priority data 512 may include cache eviction policies corresponding to network packet types.

The various modules of the environment 500 may be embodied as hardware, firmware, software, or a combination thereof. For example the various modules, logic, and other components of the environment 500 may form a portion of, or otherwise be established by, the processor 202 or other hardware components of the network devices 122. As such, in some embodiments, one or more of the modules of the environment 500 may be embodied as a circuit or collection of electrical devices (e.g., a network flow lookup circuit, a network flow hash management circuit, a network packet processing circuit, etc.). It should be appreciated that each network device 122 may include other components, sub-components, modules, and devices commonly found in a computing device, which are not illustrated in FIG. 5 for clarity of the description. Additionally, it should be understood that although each of the network devices 122 may establish the illustrative environment 500 during operation, the following discussion of the illustrative environment 500 is described with specific reference to a single network device 122 for clarity of the description.

The network flow hash lookup module 502 is configured to perform a network flow hash lookup based on the network packet received at the network device 122. In some embodiments, the network flow hash lookup module 502 may include a network packet hashing module 506 and/or a hash lookup module 508. The network packet hashing module 506 is configured to hash a portion of the header of the network packet received by the network device 122. The hash lookup module 508 is configured to perform a lookup operation using the hashed portion of the header. As noted previously, the lookup operation is performed at the first-level hash table 302, and depending on whether the lookup operation was successful, the lookup operation either returns with a location of the network flow in the network flow table 308 or continues to the second-level hash table 304, and so on. In some embodiments, each hash entry may have an access counter. When the lookup operation returns, an access counter corresponding to the hash entry of the network flow looked up in the network flow table 308 may be incremented. In some embodiments, the access counter may additionally include a time value corresponding to the last time the hash entry was accessed.

The network flow hash table management module 510 is configured to manage the location of the network flow hash entries in the multi-level hash table. In some embodiments, the network flow hash table management module 510 may include a network flow hash storage priority determination module 514 and/or a network flow hash storage location enforcement module 516. The network flow hash storage priority determination module 514 is configured to determine which flow priority, from the flow priorities stored in the flow priority data 512 received from the controller 112, should be applied to the hash entry corresponding to the network flow in the network flow table 308.

The network flow hash storage location enforcement module 516 is configured to enforce the location (i.e., the on-die cache 204 or the memory 208) of the hash entry based on the flow priority. As noted previously, certain hash entries may be locked in the first-level hash table 302 based on the flow priority and/or the access frequency of the network flows corresponding to those hash entries. Relying on cache replace algorithms, the hash entries are evicted from the on-die cache 204 to the memory 208 or promoted to the on-die cache 204 from the memory 208 based on access patterns of the hash entries. As such, hash entries corresponding to priority flows may be evicted from the on-die cache 204 to the memory 208, resulting in latency. The network flow hash storage location enforcement module 516 overcomes the deficiency of relying solely on the cache replacement algorithms by enforcing the hash entry to be located in either the on-die cache 204 or the memory 208 based on the flow priority received from the network controller 112.

In some embodiments, such as those in which the cache replacement algorithm implements a least recently used (LRU) policy, the network flow hash storage location enforcement module 516 may create a separate thread to periodically "touch" the cache lines associated with the high priority hash entries. In such embodiments, "touching" the certain cache lines sets an age bit to ensure the "touched" cache lines will not be evicted, as the age bit will not be in the LRU position. In some embodiments, a hardware load lock instruction (e.g., "loadLK") may be exposed by the processor 202 of the network device 122. In such embodiments, the hardware load lock instruction indicates to the processor whether or not to evict the cache line or lock the cache line into the on-die cache 204. In other words, the hardware load lock instruction pre-empts the cache replacement algorithm. When a network flow corresponding to a hash entry locked at a cache line in the on-die cache 204 is finished, the network controller 112 may provide an instruction to the network device 122 that the cache line of the hash entry corresponding to the network flow does not need to be locked in the on-die cache 204 anymore. In some embodiments, the processor 202 may periodically check the locked cache lines to determine whether any of the locked cache lines has become stale (i.e., the cache line has not been accessed for a predetermined duration). In some embodiments, if any of the cache lines have gotten stale, the processor 202 may unlock the stale cache lines to reduce potential latency due to cache pollution. Additionally, as will be described in further detail below, the network flow hash storage location enforcement module 516 may interpret the access counter corresponding to the hash entry of a network flow in the network flow table 308. The network flow hash storage location enforcement module 516 may interpret the access counter to determine whether to keep the hash entry in its present location or to move the hash entry (i.e., from the on-die cache 204 to the memory 208, or vice versa).

The network packet processing module 520 is configured to process network packets before transmitting the processed network packet to a target device, such as another network device 122, the remote computing device 102, or the computing device 130. In some embodiments, the network packet processing module 520 may include a routing protocol lookup module 522 and/or a packet header update module 524. The routing protocol lookup module 522 is configured to perform a lookup operation to determine which routing protocol to use to process the network packet upon the network packet being received at the on-die cache 204 from the I/O subsystem 206. In some embodiments, performing the lookup operation may include looking up the routing protocol in a lookup table of the network device 122. The packet header update module 524 is configured to update the header of the network packet. The updated header may include, for example, updated network flow information retrieved by the network flow hash lookup module 502.

Figure 6:
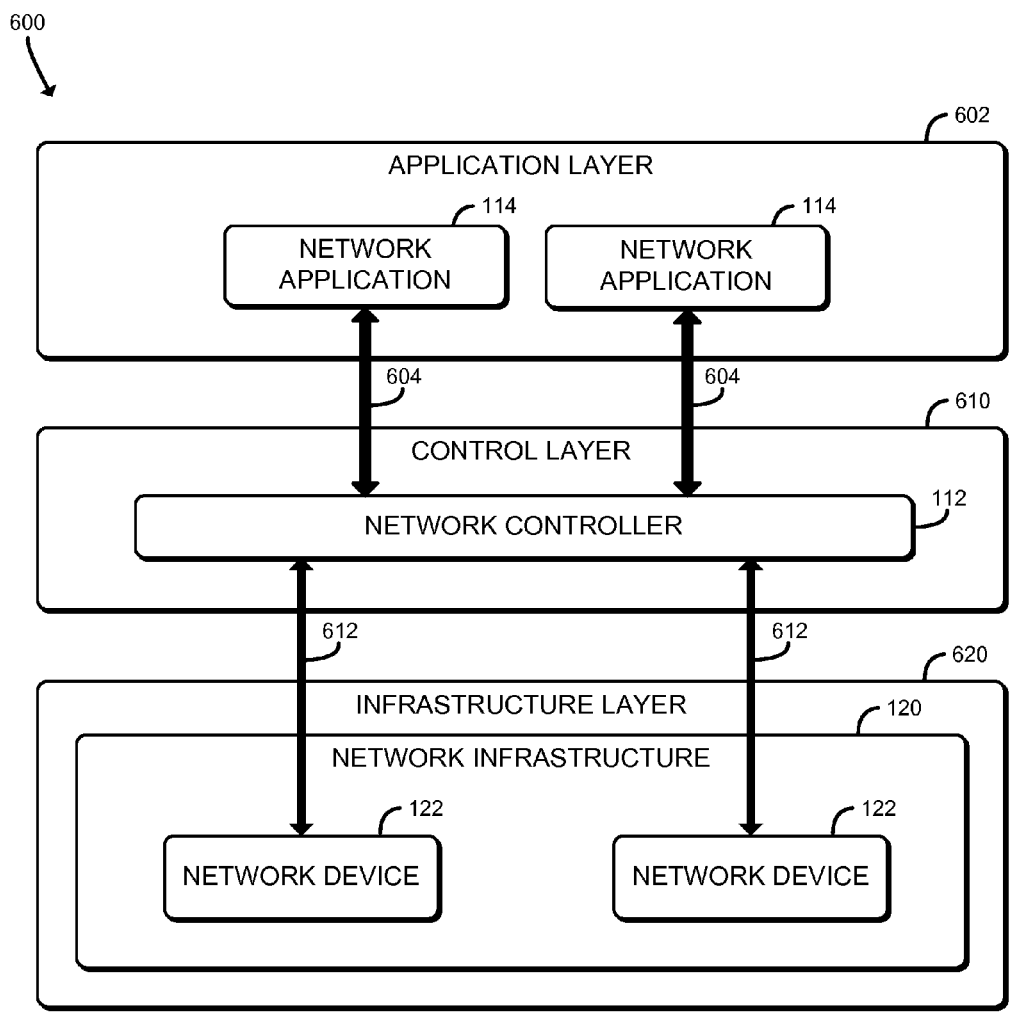
FIG. 6 is a simplified block diagram of at least one embodiment of a software defined network architecture of the system of FIG. 1.

Referring now to FIG. 6, an illustrative embodiment of an SDN architecture 600, which may be implemented by the system 100, includes an application layer 602, a control layer 610, and an infrastructure layer 620. The application layer 602 may include one or more network applications 114 and the infrastructure layer 620 may include one or more network devices 122. In SDN architecture embodiments, the system 100 is generally an application defined networking (ADN) network. Accordingly, the network applications 114 control the behavior of the network devices 122 in the ADN network. To do so, the network applications 114 communicate their requirements to the network controller 112 and receive feedback from the network controller 112 via northbound APIs 604. In some embodiments, the requirements may be based on requirements of the remote application 106 and/or a network packet type. The northbound APIs 604 provide a network abstraction interface to allow the network applications 114 of the application layer 602 to communicate information, including network packet flow and policy information, to the network controller 112 of the control layer 610. The information received at the network controller 112 is passed through southbound APIs 612 to define and control the behavior of the network devices 122.

Figure 7:
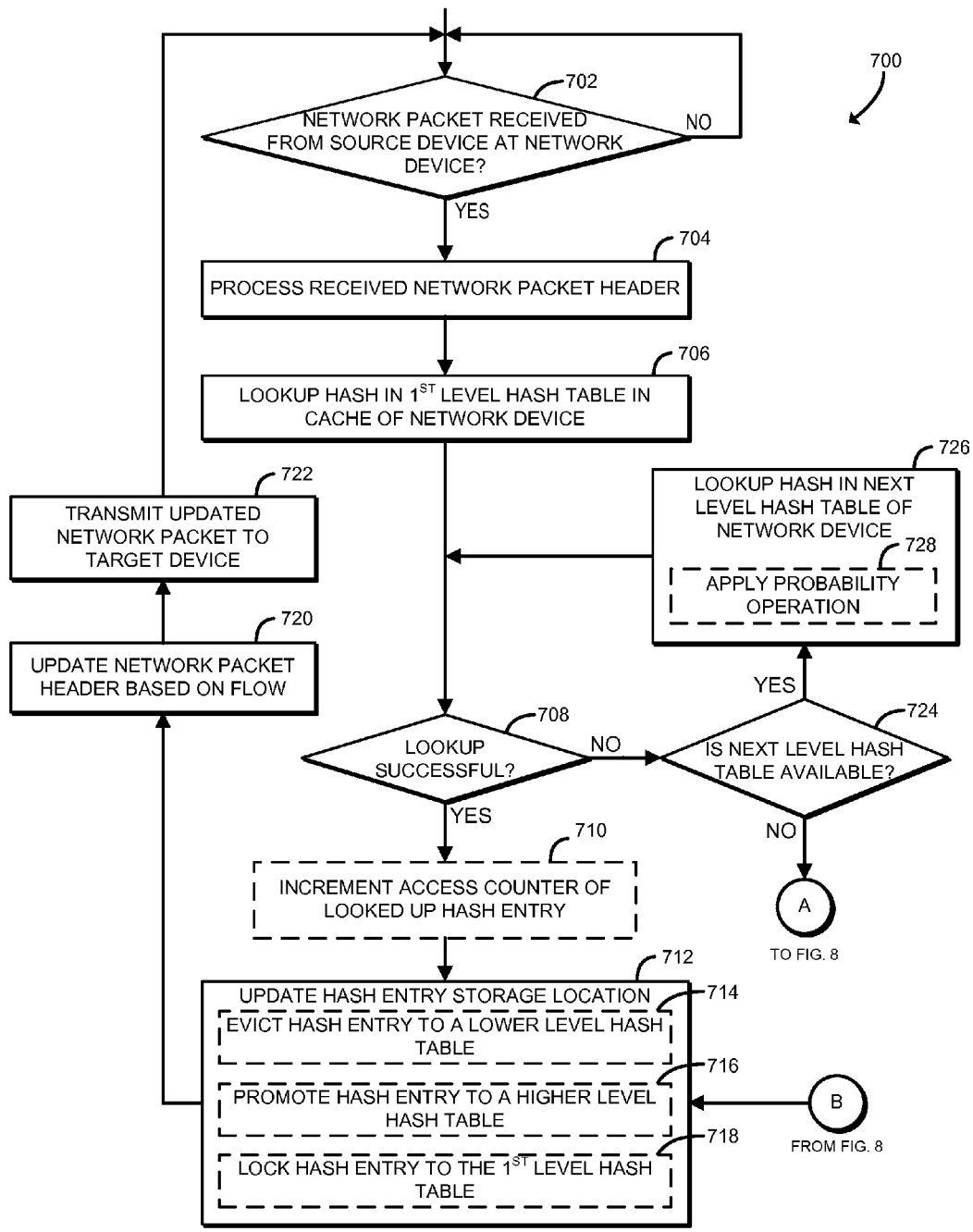
FIG. 7 is a simplified flow diagram of at least one embodiment of a method for managing cache eviction policies of the network device of FIG. 2.

Referring now to FIG. 7, in use, each network device 122 may execute a method 700 for performing a lookup for a hash entry of a network flow hash table, such as the network flow table 308 of FIG. 3. The method 700 begins in block 702, in which the network device 122 determines whether a network packet was received at the network device 122 from a source device. The source device may be the remote computing device 102 or another network device 122, depending on the location of the network device 122 in the network infrastructure 120 that received the network packet. If a network packet was not received, the method 700 loops back to block 702 to continue monitoring for network packets. If a network packet was received at the network device 122, a header of the network packet is processed at block 704. Processing the header of the network packet may include any type of packet processing, including, for example, performing a hash on at least a portion of the network packet header, extracting key fields, and/or performing a lookup to determine a flow corresponding to the network packet type. In block 706, the network device 122 performs a hash lookup at the first-level hash table 302 using the result (i.e., the hash) of the portion of the network packet header generated in block 704.

In block 708, the network device 122 determines whether the hash lookup performed prior to the method 700 advancing to block 708 was successful. If the hash lookup was successful (i.e., resulted in a "hit"), the method 700 advances to block 712. In some embodiments, as in block 710, the network device 122 may increment an access counter corresponding to the looked up hash entry prior to advancing to block 712. As noted previously, an access counter corresponding to each hash entry may be used by the network device 122 to track the access frequency of the hash entries. In some embodiments, the access counter may additionally include a timestamp indicating the last time the access counter was incremented.

In block 712, the network device 122 updates the storage location of the hash entry. In certain multi-level hash table arrangements, updating the storage location of the hash entry may include evicting the hash entry from the on-die cache 204 to the memory 208, promoting the hash entry to the on-die cache 204 from the memory 208, and/or moving the hash entry to a different level of the multi-level hash table in the same storage location (e.g., moving the hash entry from the first-level hash table 302 residing in the on-die cache 204 to a portion of the second-level hash table 304 also residing in the on-die cache 204, as shown in FIG. 4).

Under certain conditions, the network device 122 may evict the hash entry to a lower level hash table, as in block 714. For example, the network device 122 may evict the hash entry to a lower level hash table if the network flow corresponding to the hash entry is no longer active, has not been accessed for a predetermined period of time, and/or a higher priority network flow needs the space in the on-die cache 204.

Under certain conditions, the network device 122 may promote the hash entry to a higher level hash table, as in block 716. For example, the network device 122 may promote the hash entry to a higher level hash table if the network flow corresponding to the hash entry becomes active, the number of accesses over a predetermined period of time has exceeded an access frequency threshold, and/or the network flow corresponding to the hash entry has a higher priority than a hash entry presently residing in the on-die cache 204.

Under certain conditions, the network device 122 may lock the hash entry into the first-level hash table 302, as in block 718. In some embodiments, such as an embodiment implementing the LRU cache replacement algorithm, the network device 122 may lock the hash entry into the first-level hash table 302 by "touching" a cache line of the hash entry with a thread dedicated to "touching" cache lines of hash entries with high priorities. As such, "touching" the targeted cache lines ensures the cache lines of the hash entries with high priorities will not be in the LRU position, and therefore will not be evicted. It is contemplated, in some embodiments where the processor 202 is a multi-core processor, that the thread may be run on a separate core of the processor 202 to avoid resource contention. In some embodiments, the processor 202 of the network device 122 may expose a load lock instruction (i.e., a bit indicating whether to lock the cache line into the first-level hash table 302) such that software of the network device 122 can instruct the processor 202 not to evict certain cache lines of particular hash entries to lock into the first-level hash table 302.

After the network device 122 has updated the storage location of the hash entry, the method advances to block 720, where the network packet header is updated based on the network flow corresponding to the hash entry. In block 722, the updated network packet is transmitted to a target device. Depending on the location of the network device 122 in the network infrastructure 120 and the network flow, the target device may be another network device 122, the remote computing device 102, or the computing device 130. From block 722, the method 700 loops back to block 702.

If the hash lookup was not successful (i.e., resulted in a "miss") at block 708, the method 700 advances to block 724. In block 724, the network device 122 determines whether a next level hash table is available. For example, in a first iteration, the next level hash table corresponds to the second-level hash table 304. Each subsequent iteration would increment the level of hash table until the "Nth" level hash table 306 is reached. If a next level hash table is available, a hash lookup is performed on the hash table at the next level at block 726. In other words, a hash lookup is performed at block 726 for each subsequent iteration of block 724.

In some embodiments, the hash lookup may include performing a probability operation on the next level hash table prior to performing the hash lookup in block 728. In some embodiments, the probability operation may be performed to determine a probability of whether a hash entry is in the hash table prior to performing the lookup. Performing the probability operation reduces latency attributable to a "miss" on the hash lookup. The probability operation may be performed using any type of probability method capable of determining a probability that a hash entry is located in a hash table. For example, in an embodiment using a bloom filter, the bloom filter has a bit vector base data structure. To add an element to the bloom filter, a hash of a key may be used to set the corresponding bits in the bit vector. To determine whether the hash entry is in the hash table which the hash lookup is to be performed on, the hash of the key is applied, and then the set bits are checked in the appropriate bit vector. If the set bits are not in the bit vector, then the hash entry is not in the hash table which the hash lookup is to be performed on. If the set bits are in the bit vector, then the hash entry might be in the hash table which the hash lookup is to be performed on. In some embodiments, the probability operation may additionally be performed prior to performing the hash lookup in the first-level hash table 302, as well. In doing so, the latency associated with performing searches in levels of the hash table may be reduced, further improving overall lookup time.

Figure 8:
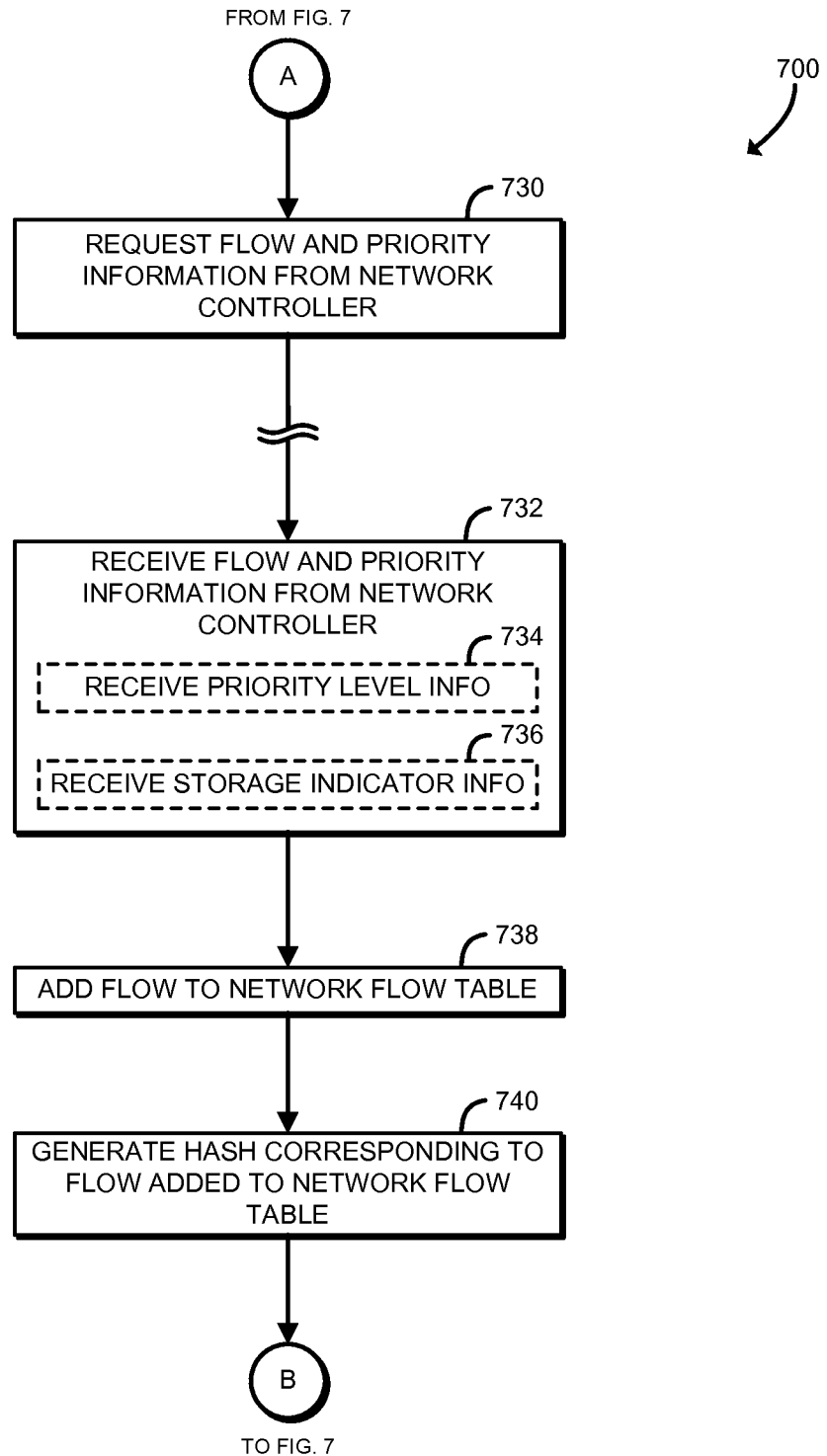
FIG. 8 is a simplified flow diagram of at least one embodiment of a method for receiving flow policy information of the system of FIG. 1.

If a next level hash table is not available at block 724, the method 700 advances to block 730, which is illustrated in FIG. 8. At block 730, a request is sent from the network device 122 to the network controller 112 for flow priority information corresponding to the network packet received at block 702. At block 732, the network flow and the flow priority information are received from the network controller. In some embodiments, at block 734, the flow priority information may include a level of priority to be assigned to the hash entry corresponding to the network flow of the received network packet. In some embodiments, at block 736, the flow priority information may additionally or alternatively include an indication whether to set a bit of the hash entry corresponding to the load lock instruction. At block 738, the network flow is added to the network flow table 308. At block 740, a hash is generated corresponding to the network flow added to the network flow table 308 at block 738 before the method 700 advances to block 712 to update the storage location of the hash generated at block 740.

It should be appreciated that although the cache 204 is described above as an on-die cache, or an on-processor cache, in some embodiments, the cache 204 may be embodied as any type of cache memory that the processor 202 of the computing device 102 can access more quickly than the memory 208. For example, in some embodiments, the cache 204 may be an off-die cache, but reside on the same SoC as the processor 202.

EXAMPLES

Illustrative examples of the technologies disclosed herein are provided below. An embodiment of the technologies may include any one or more, and any combination of, the examples described below.

Example 1 includes a network device for storage location management of a network flow hash that corresponds to a network flow, the network device comprising a cache for a processor of the network device; a main memory different from the cache; a network flow table stored in the main memory that includes the network flow; a multi-level flow hash table that includes a plurality of flow hash tables, wherein the plurality of flow hash tables comprises a first-level flow hash table stored in the cache and a second-level flow hash table, wherein at least a portion of the second-level flow hash table is stored in the cache; and a network flow hash table management module to receive a priority that corresponds to the network flow from a network controller communicably coupled to the network device and to store the network flow hash that corresponds to the network flow at either of the first-level or second-level flow hash tables based on the received priority.

Example 2 includes the subject matter of Example 1, and wherein each of the first-level and second-level flow hash tables includes a plurality of network flow hashes, and wherein each of the network flow hashes corresponds to a network flow of the network flows in the network flow table.

Example 3 includes the subject matter of any of Examples 1 and 2, and wherein to store the network flow hash that corresponds to the network flow at either of the first-level or second-level flow hash tables comprises to store the network flow hash at the first-level flow hash table in response to a determination that the priority that corresponds to the network flow hash is greater than a priority that corresponds to another network flow hash presently stored at the first-level flow hash table.

Example 4 includes the subject matter of any of Examples 1-3, and wherein the network flow hash table management module is further to evict the another network flow hash to the second-level flow hash table in response to the determination that the priority that corresponds to the network flow hash is greater than the priority that corresponds to the another network flow hash.

Example 5 includes the subject matter of any of Examples 1-4, and wherein to store the network flow hash that corresponds to the network flow at either of the first-level or second-level flow hash tables comprises to store the network flow hash at the first-level flow hash table in response to a determination that a frequency of access of the network flow hash is greater than a frequency of access of another network flow hash presently stored at the first-level flow hash table.

Example 6 includes the subject matter of any of Examples 1-5, and wherein to store the network flow hash that corresponds to the network flow at either of the first-level or second-level flow hash tables is further based on an access frequency of the network flow hash.

Example 7 includes the subject matter of any of Examples 1-6, and wherein to store the network flow hash that corresponds to the network flow at either of the first-level or second-level flow hash tables comprises to store the network flow hash at the first-level flow hash table in response to a determination that the access frequency of the network flow hash is greater than an access frequency of another network flow hash presently stored at the first-level flow hash table.

Example 8 includes the subject matter of any of Examples 1-7, and wherein another portion of the second-level flow hash table is stored in the main memory of the network device.

Example 9 includes the subject matter of any of Examples 1-8, and wherein to store the network flow hash that corresponds to the network flow at either of the first or second-level flow hash tables comprises to store the network flow hash at the portion of the second-level flow hash table stored in the cache in response to a determination that the priority that corresponds to the network flow hash is less than the priorities of the network flow hashes presently stored at the first-level flow hash table and an access frequency that corresponds to the network flow hash is greater than the access frequencies of other network flow hashes presently stored at the portion of the second-level flow hash table stored in the cache.

Example 10 includes the subject matter of any of Examples 1-9, and wherein the network flow hash table management module is further to lock the network flow hash that corresponds to the network flow in cache based on the priority received from the network controller.

Example 11 includes the subject matter of any of Examples 1-10, and wherein the cache includes a plurality of cache lines, each cache line capable of housing the network flow hash, and wherein to lock the network flow hash in cache comprises to set a bit of a cache line that corresponds to the network flow hash based on the priority received from the network controller.

Example 12 includes the subject matter of any of Examples 1-11, and wherein to set the bit of the cache line comprises to set an age bit of the cache line.

Example 13 includes the subject matter of any of Examples 1-12, and wherein to set the bit of the cache line comprises to set an eviction indicator bit of the cache line.

Example 14 includes the subject matter of any of Examples 1-13, and further including a network flow hash lookup module to hash at least a portion of a header of the network packet received by the network device and perform a first lookup for the hashed portion of the header of the network packet at the first-level flow hash table of the multi-level flow hash table.

Example 15 includes the subject matter of any of Examples 1-14, and wherein the network flow hash lookup module is further to perform a second lookup for the hashed portion of the header of the network packet at the second-level flow hash table subsequent to an unsuccessful first lookup at the first-level flow hash table.

Example 16 includes the subject matter of any of Examples 1-15, and further including wherein the network flow hash lookup module is further to perform a probability operation to determine a probability of whether the network flow hash that corresponds to the hashed portion of the header of the network packet is in the second-level flow hash table prior to performing the second lookup.

Example 17 includes the subject matter of any of Examples 1-16, and wherein the network flow hash lookup module is further to update access information that corresponds to the network flow hash.

Example 18 includes the subject matter of any of Examples 1-17, and wherein to update the access information that corresponds to the network flow hash comprises to increment an access counter of the network flow hash to provide an access frequency.

Example 19 includes the subject matter of any of Examples 1-18, and wherein to update the access information that corresponds to the network flow hash further comprises to update a timestamp of the network flow hash to provide an indication of the last time the access counter of the network flow hash was incremented.

Example 20 includes a method for managing storage locations of network flow hashes corresponding to network flows, the method comprising receiving, by a network device, a network flow and a priority corresponding to the network flow from a network controller; storing, by the network device, the network flow to a network flow table in a main memory of the network device; generating, by the network device, a network flow hash corresponding to the network flow; and storing, by the network device, the network flow hash corresponding to the network flow at one of a first-level flow hash table or a second-level flow hash table of a multi-level flow hash table based on the priority received from the network controller, wherein the first-level flow hash table is stored in a cache for a processor of the network device, and wherein at least a portion of the second-level flow hash table is stored in the cache.

Example 21 includes the subject matter of Example 20, and wherein each of the first-level and second-level flow hash table include a plurality of network flow hash entries corresponding to a plurality of network flows stored in the network flow table.

Example 22 includes the subject matter of any of Examples 20 and 21, and wherein storing the network flow hash comprises storing the network flow hash in the first-level flow hash table in response to a determination that the priority that corresponds to the network flow hash is greater than a priority that corresponds to another network flow hash presently stored at the first-level flow hash table Example 23 includes the subject matter of any of Examples 20-22, and further including evicting, by the network device, the another network flow hash to the second-level flow hash table in response to the determination that the priority that corresponds to the network flow hash is greater than the priority that corresponds to another network flow hash.

Example 24 includes the subject matter of any of Examples 20-23, and wherein storing the network flow hash comprises storing the network flow hash in the first-level flow hash table subsequent to determining a frequency of access of the network flow hash is greater than a frequency of access of another network flow hash presently stored at the first-level flow hash table.

Example 25 includes the subject matter of any of Examples 20-24, and, wherein another portion of the second-level flow hash table is stored in the main memory of the network device.

Example 26 includes the subject matter of any of Examples 20-25, and wherein storing the network flow hash comprises storing the network flow hash in the portion of the second-level flow hash table stored in the cache of the processor in response to determining the priority corresponding to the network flow hash is less than the priorities of the network flow hashes presently stored at the first-level flow hash table and an access frequency of the network flow hash is greater than the access frequencies of other network flow hashes presently stored at the portion of the second-level flow hash table stored in the cache of the processor.

Example 27 includes the subject matter of any of Examples 20-26, and further including locking, by the network device, the network flow hash that corresponds to the network flow in cache based on the priority received from the network controller.

Example 28 includes the subject matter of any of Examples 20-27, and wherein the cache includes a plurality of cache lines, each cache line capable of housing the network flow hash, and wherein locking the network flow hash in cache comprises setting a bit of a cache line that corresponds to the network flow hash based on the priority received from the network controller.

Example 29 includes the subject matter of any of Examples 20-28, and wherein setting the bit of the cache line comprises setting an age bit of the cache line.

Example 30 includes the subject matter of any of Examples 20-29, and wherein setting the bit of the cache line comprises setting an eviction indicator bit of the cache line.

Example 31 includes the subject matter of any of Examples 20-30, and further including hashing, by the network device, at least a portion of a header of the network packet received by the network device; and performing, by the network device, a first lookup for the hashed portion of the header of the network packet at the first-level flow hash table of the multi-level flow hash table.

Example 32 includes the subject matter of any of Examples 20-31, and further including performing, by the network device, a second lookup for the hashed portion of the header of the network packet at the second-level flow hash table subsequent to an unsuccessful first lookup at the first-level flow hash table.

Example 33 includes the subject matter of any of Examples 20-32, and further including performing, by the network device, a probability operation to determine a probability of whether the network flow hash corresponding to the hashed portion of the header of the network packet is in the second-level flow hash table prior to performing the second lookup.

Example 34 includes the subject matter of any of Examples 20-33, and further including updating, by the network device, access information corresponding to the network flow hash.

Example 35 includes the subject matter of any of Examples 20-34, and wherein updating the access information corresponding to the network flow hash comprises incrementing an access counter of the network flow hash to provide an access frequency.

Example 36 includes the subject matter of any of Examples 20-35, and wherein updating the access information corresponding to the network flow hash further comprises updating a timestamp of the network flow hash to provide an indication of the last time the access counter of the network flow hash was incremented.

Example 37 includes a network device comprising a processor; and a memory having stored therein a plurality of instructions that when executed by the processor cause the network device to perform the method of any of Examples 20-36.

Example 38 includes one or more machine readable storage media comprising a plurality of instructions stored thereon that in response to being executed result in a network device performing the method of any of Examples 20-36.

Example 39 includes a computing device for managing storage locations of network flow hashes corresponding to network flows, the computing device comprising means for receiving a network flow and a priority corresponding to the network flow from a network controller; means for storing the network flow to a network flow table in a main memory of the network device; means for generating a network flow hash corresponding to the network flow; and means for storing the network flow hash corresponding to the network flow at one of a first-level flow hash table or a second-level flow hash table of a multi-level flow hash table based on the priority received from the network controller, wherein the first-level flow hash table is stored in a cache for a processor of the network device, and wherein at least a portion of the second-level flow hash table is stored in the cache.

Example 40 includes the subject matter of Example 39, and wherein each of the first-level and second-level flow hash table include a plurality of network flow hash entries corresponding to a plurality of network flows stored in the network flow table.

Example 41 includes the subject matter of any of Examples 39 and 40, and wherein the means for storing the network flow hash comprises means for storing the network flow hash in the first-level flow hash table in response to a determination that the priority that corresponds to the network flow hash is greater than a priority that corresponds to another network flow hash presently stored at the first-level flow hash table Example 42 includes the subject matter of any of Examples 39-41, and further including means for evicting the another network flow hash to the second-level flow hash table in response to the determination that the priority that corresponds to the network flow hash is greater than the priority that corresponds to another network flow hash.

Example 43 includes the subject matter of any of Examples 39-42, and wherein the means for storing the network flow hash comprises means for storing the network flow hash in the first-level flow hash table subsequent to determining a frequency of access of the network flow hash is greater than a frequency of access of another network flow hash presently stored at the first-level flow hash table.

Example 44 includes the subject matter of any of Examples 39-43, and wherein another portion of the second-level flow hash table is stored in the main memory of the network device.

Example 45 includes the subject matter of any of Examples 39-44, and wherein the means for storing the network flow hash comprises means for storing the network flow hash in the portion of the second-level flow hash table stored in the cache in response to determining the priority corresponding to the network flow hash is less than the priorities of the network flow hashes presently stored at the first-level flow hash table and an access frequency of the network flow hash is greater than the access frequencies of other network flow hashes presently stored at the portion of the second-level flow hash table stored in the cache.

Example 46 includes the subject matter of any of Examples 39-45, and further including means for locking the network flow hash that corresponds to the network flow in cache based on the priority received from the network controller.

Example 47 includes the subject matter of any of Examples 39-46, and wherein the cache includes a plurality of cache lines, each cache line capable of housing the network flow hash, and wherein the means for locking the network flow hash in cache comprises means for setting a bit of a cache line that corresponds to the network flow hash based on the priority received from the network controller.

Example 48 includes the subject matter of any of Examples 39-47, and wherein the means for setting the bit of the cache line comprises means for setting an age bit of the cache line.

Example 49 includes the subject matter of any of Examples 39-48, and wherein the means for setting the bit of the cache line comprises means for setting an eviction indicator bit of the cache line.

Example 50 includes the subject matter of any of Examples 39-49, and further including means for hashing at least a portion of a header of the network packet received by the network device; and means for performing a first lookup for the hashed portion of the header of the network packet at the first-level flow hash table of the multi-level flow hash table.

Example 51 includes the subject matter of any of Examples 39-50, and further including means for performing a second lookup for the hashed portion of the header of the network packet at the second-level flow hash table subsequent to an unsuccessful first lookup at the first-level flow hash table.

Example 52 includes the subject matter of any of Examples 39-51, and further including means for performing a probability operation to determine a probability of whether the network flow hash corresponding to the hashed portion of the header of the network packet is in the second-level flow hash table prior to performing the second lookup.

Example 53 includes the subject matter of any of Examples 39-52, and further including means for updating access information corresponding to the network flow hash.

Example 54 includes the subject matter of any of Examples 39-53, and wherein the means for updating the access information corresponding to the network flow hash comprises means for incrementing an access counter of the network flow hash to provide an access frequency.

Example 55 includes the subject matter of any of Examples 39-54, and, wherein the means for updating the access information corresponding to the network flow hash further comprises means for updating a timestamp of the network flow hash to provide an indication of the last time the access counter of the network flow hash was incremented.

The invention claimed is:

1. A network device for storage location management of a network flow hash that corresponds to a network flow, the network device comprising:

a cache for a processor of the network device;
a main memory different from the cache;
a network flow table stored in the main memory that includes the network flow;
a multi-level flow hash table that includes a plurality of flow hash tables, wherein the plurality of flow hash tables comprises a first-level flow hash table stored in the cache and a second-level flow hash table, wherein at least a portion of the second-level flow hash table is stored in the cache; and
a network flow hash table management module to receive a priority that corresponds to the network flow from a network controller communicably coupled to the network device and store a network flow hash that corresponds to the network flow at either of the first-level or second-level flow hash tables based on the received priority, wherein to store the network flow hash comprises to store the network flow hash at the first-level flow hash table in response to a determination that the priority that corresponds to the network flow is greater than a priority that corresponds to another network flow hash presently stored at the first-level flow hash table, wherein to store the network flow hash further comprises to evict the another network flow hash from the first-level flow hash table to the second-level flow hash table.

2. The network device of claim 1, wherein to store the network flow hash that corresponds to the network flow at either of the first-level or second-level flow hash tables comprises to store the network flow hash at the first-level flow hash table in response to a determination that a frequency of access of the network flow hash is greater than a frequency of access of the another network flow hash presently stored at the first-level flow hash table.

3. The network device of claim 1, wherein to store the network flow hash that corresponds to the network flow at either of the first-level or second-level flow hash tables comprises to store the network flow hash at the first-level flow hash table in response to a determination that a frequency of access of the another network flow hash presently stored at the first-level flow hash table has (i) a lower priority level than the network flow hash and (ii) the frequency of access of the another network flow does not exceed an access frequency threshold.

4. The network device of claim 1, wherein another portion of the second-level flow hash table is stored in the main memory of the network device.

5. The network device of claim 1, wherein to store the network flow hash that corresponds to the network flow at either of the first-level or second-level flow hash tables comprises to store the network flow hash at the portion of the second-level flow hash table stored in the cache in response to a determination that the priority that corresponds to the network flow hash is less than the priorities of other network flow hashes presently stored at the first-level flow hash table and an access frequency that corresponds to the network flow hash is greater than the access frequencies of the other network flow hashes presently stored at the portion of the second-level flow hash table stored in the cache.

6. The network device of claim 1, wherein the network flow hash table management module is further to lock the network flow hash that corresponds to the network flow in cache based on the priority received from the network controller, wherein the cache includes a plurality of cache lines, each cache line capable of housing the network flow hash, and wherein to lock the network flow hash in cache comprises to set a bit of a cache line that corresponds to the network flow hash based on the priority received from the network controller.

7. The network device of claim 6, wherein to set the bit of the cache line comprises to set at least one of an age bit and an eviction indicator bit of the cache line.

8. The network device of claim 1, further comprising:
a network flow hash lookup module to hash at least a portion of a header of the network packet received by the network device and perform a first lookup for the hashed portion of the header of the network packet at the first-level flow hash table of the multi-level flow hash table and to perform a second lookup for the hashed portion of the header of the network packet at the second-level flow hash table subsequent to an unsuccessful first lookup at the first-level flow hash table.

9. The network device of claim 8, further comprising:
wherein the network flow hash lookup module is further to perform a probability operation to determine a probability of whether the network flow hash that corresponds to the hashed portion of the header of the network packet is in the second-level flow hash table prior to performing the second lookup.

10. The network device of claim 1, wherein the network flow hash lookup module is further to update access information that corresponds to the network flow hash.

11. The network device of claim 10, wherein to update the access information that corresponds to the network flow hash comprises to increment an access counter of the network flow hash to provide an access frequency.

12. A method for managing storage locations of network flow hashes corresponding to network flows, the method comprising:
receiving, by a network device, a network flow and a priority corresponding to the network flow from a network controller;
storing, by the network device, the network flow to a network flow table in a main memory of the network device;
generating, by the network device, a network flow hash corresponding to the network flow; and
storing, by the network device, the network flow hash corresponding to the network flow at one of a first-level flow hash table or a second-level flow hash table of a multi-level flow hash table based on the priority received from the network controller, wherein storing the network flow hash comprises storing the network flow hash in the first-level flow hash table in response to a determination that the priority that corresponds to the network flow is greater than a priority that corresponds to another network flow hash presently stored at the first-level flow hash table, wherein storing the network flow hash further comprises evicting the another network flow hash from the first-level flow hash table to the second,
wherein the first-level flow hash table is stored in a cache for a processor of the network device, and
wherein at least a portion of the second-level flow hash table is stored in the cache.

13. The method of claim 12, wherein storing the network flow hash comprises storing the network flow hash in the first-level flow hash table subsequent to determining a frequency of access of the network flow hash is greater than a frequency of access of another network flow hash presently stored at the first-level flow hash table.

14. The method of claim 12, wherein storing the network flow hash comprises storing the network flow hash in the portion of the second-level flow hash table stored in the cache in response to determining the priority corresponding to the network flow hash is less than the priorities of the network flow hashes presently stored at the first-level flow hash table and an access frequency of the network flow hash is greater than the access frequencies of other network flow hashes presently stored at the portion of the second-level flow hash table stored in the cache of the processor.

15. The method of claim 12, further comprising:
locking, by the network device, the network flow hash that corresponds to the network flow in cache based on the priority received from the network controller,
wherein the cache includes a plurality of cache lines, each cache line capable of housing the network flow hash, and
wherein locking the network flow hash in cache comprises setting a bit of a cache line that corresponds to the network flow hash based on the priority received from the network controller.

16. One or more non-transitory, computer-readable storage media comprising a plurality of instructions stored thereon that in response to being executed cause a computing device to:
receive a network flow and a priority corresponding to the network flow from a network controller;
store the network flow to a network flow table in a main memory of the network device;
generate a network flow hash corresponding to the network flow; and
store the network flow hash corresponding to the network flow at one of a first-level flow hash table or a second-level flow hash table of a multi-level flow hash table based on the priority received from the network controller, wherein to store the network flow hash comprises to store the network flow hash in the first-level flow hash table in response to a determination that the priority that corresponds to the network flow is greater than a priority that corresponds to another network flow hash presently stored at the first-level flow hash table, wherein to store the network flow hash further comprises to evict the another network flow hash from the first-level flow hash table to the second-level flow hash table,
wherein the first-level flow hash table is stored in a cache for a processor of the network device, and
wherein at least a portion of the second-level flow hash table is stored in the cache.

17. The one or more non-transitory, computer-readable storage media of claim 16, wherein to store the network flow hash comprises to store the network flow hash in the first-level flow hash table subsequent to determining a frequency of access of the network flow hash is greater than a frequency of access of another network flow hash presently stored at the first-level flow hash table.

18. The one or more non-transitory, computer-readable storage media of claim 16, wherein to store the network flow hash comprises to store the network flow hash in the portion of the second-level flow hash table stored in the cache in response to determining the priority corresponding to the network flow hash is less than the priorities of the network flow hashes presently stored at the first-level flow hash table and an access frequency of the network flow hash is greater than the access frequencies of other network flow hashes presently stored at the portion of the second-level flow hash table stored in the cache.

19. The one or more non-transitory, computer-readable storage media of claim 16, further comprising a plurality of instructions that in response to being executed cause the computing device to:

lock the network flow hash that corresponds to the network flow in cache based on the priority received from the network controller, wherein the cache includes a plurality of cache lines, each cache line capable of housing the network flow hash, and wherein locking the network flow hash in cache comprises setting a bit of a cache line that corresponds to the network flow hash based on the priority received from the network controller.

20. The one or more non-transitory, computer-readable storage media of claim 16, further comprising a plurality of instructions that in response to being executed cause the computing device to:

hash at least a portion of a header of the network packet received by the network device;

perform a first lookup for the hashed portion of the header of the network packet at the first-level flow hash table of the multi-level flow hash table; and perform a second lookup for the hashed portion of the header of the network packet at the second-level flow hash table subsequent to an unsuccessful first lookup at the first-level flow hash table.

21. The one or more non-transitory, computer-readable storage media of claim 20, further comprising a plurality of instructions that in response to being executed cause the computing device to:

perform a probability operation to determine a probability of whether the network flow hash corresponding to the hashed portion of the header of the network packet is in the second-level flow hash table prior to performing the second lookup.

* * * * *